Jan. 14, 1969 W. A. WATERS 3,421,524
POWER DRIVEN DENTAL CLEANER
Filed Sept. 22, 1966

INVENTOR.
WILLIAM A. WATERS
BY Head & Johnson
ATTORNEYS

United States Patent Office 3,421,524
Patented Jan. 14, 1969

3,421,524
POWER DRIVEN DENTAL CLEANER

William A. Waters, 3648 E. 49th St., Tulsa, Okla. 74135
Filed Sept. 22, 1966, Ser. No. 581,235
U.S. Cl. 132—92                                10 Claims
Int. Cl. A61c 15/00

This invention relates to a tooth cleaning device. More particularly, this invention relates to a power driven tooth cleaning device which cleans the areas between and around the teeth by the oscillatory motion of a strand of dental tape.

In recent years, electric toothbrushes have become increasingly popular for cleaning the teeth. The advantage which these devices have over hand brushing of the teeth lies in the ability of these power-driven appliances to provide a high speed brushing action. However, even the high speed brushing action of an electric toothbrush does not provide complete dental hygiene in that the areas between the teeth cannot be properly cleaned or particles removed.

The areas between the teeth are best cleaned by the operation of dental floss or tape. Usually, this is supplied on small spools from which the user unrolls a short length which he stretches between his two hands and uses by placing the thumb and forefinger of one hand holding one portion of the floss inside the mouth. This is a cumbersome and unsanitary operation, and eventually devices were designed which stretched the floss tautly between two extending finger components. However, most of these hand held devices were cumbersome in shape and simply provided the same type of cleaning motion that is provided by a strand of dental floss held between the two hands.

The primary object of this invention is to provide a device which will permit the areas between the teeth to be cleaned thoroughly, efficiently and sanitarily.

Another object of this invention is to provide a device which will rapidly and efficiently clean the areas between the teeth by employment of dental tape with high speed mechanical oscillation.

Further objects and advantages of the invention will become apparent from the following description and claims, and from the accompanying drawings wherein:

Figure 1:
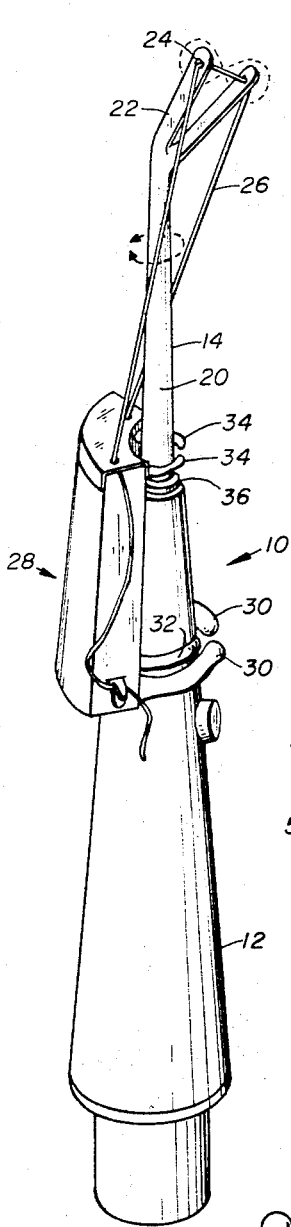
FIGURE 1 is a perspective view of one form of the invention.

Broadly speaking, the invention comprises a power unit which is adapted to receive a tooth cleaning component shown as an elongated shaft having a pair of prongs extending in a plane which is at an angle to the longitudinal axis of the shaft, and a dental tape supply holding member removably positioned on the power unit. A spool of dental tape is contained in the supply holding member and the tape is threaded through the top of the supply member through an eyelet in each of the prongs and back through the sliding lid of the supply member. Interlocking serrations on the top of the supply member and the sliding lid enmesh the dental tape to hold it taut. The reason for the effectiveness of the invention is not completely understood, but it is believed in theory that since the power unit rotates the shaft through a small arc, and since the dental tape is held securely by the cooperation of the slide cover and supply container top and partly because of the flexibility of the prongs, the dental tape moves in a manner to describe a figure similar to the surface of two cones jointed at their apices as shown in FIGURE 1. It is further believed that this conical movement pulls the dental tape around the tooth surface to cover more area than would be possible if the movement of the tape were simply a back and forth motion.

Figure 2:
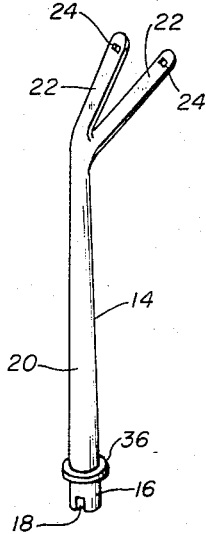
FIGURE 2 is a perspective view of a tooth cleaner component of the invention showing it detached from a power unit or component.

Referring now to the drawings in detail, the power driven dental cleaner of this invention referred to generally by the numeral 10 includes a power unit 12 which is preferably an electric unit such as powers the conventional electric toothbrush, either directly attached to a source of electric supply or operated by rechargeable batteries or conventional batteries, although a spring-wound motor is conceivable. The usual electric driven toothbrush moves the toothbrush oscillatorily giving the brush component an arcuate movement, and generally the brush component is removable. Usually, the toothbrush fits by clamping engagement into the power unit. In FIGURE 2 is shown a tooth cleaner member 14 which is designed to fit clampingly into power unit 12 by cooperation of lower end 16 and slot 18 of tooth cleaner 14 with opposite clamping portions (not shown) in the interior of power unit 12. Thus, tooth cleaner member 14 may be made interchangeable with a conventional toothbrush attachment so that the same power drive unit may operate both attachments. Tooth cleaner member 14 also includes a slender elongated shaft 20 and two prongs 22 at the end of shaft 20, all designed to be of slender configuration so that the cleaner portion will take up a minimum amount of room in the user's mouth. Prongs 22 extend from the end of shaft 20 at a small angle with respect to each other and lie in a plane which forms a slight angle, preferably acute, with respect to the longitudinal axis of shaft 20. It is the angle provided by the plane of prongs 22 with respect to shaft 20 and the flexibility of the thin portion of shaft 20 which provides an arcuate movement to the extremities of prongs 22. Near the end of each prong 22 is an eyelet or opening 24 through which dental tape may be loosely threaded without restriction in the opening. FIGURE 1 describes a tooth cleaner member 14 in position on a power unit 12 with a strand of dental tape 26 threaded through each eyelet 24. Although the tooth cleaning device described in the figures is shown to be of a configuration normally to be considered as "right-handed," it is to be understood that the device could also be of "left-handed."

In FIGURE 1 a dental tape supply holding member is shown in position on power unit 12. The tape supply holding member comprises preferably an enclosed container 28 held in position on power unit 12 by a pair of flexible clamps 30 positioned below a ridge 32 on power unit 12. Instead of ridge 32, clamps 30 may fit into a groove around power unit 12. Although FIGURE 1 shows the dental tape supply holding member as an enclosed container, this could also be a member having an open framework or casing, but for sanitary purposes it is preferred to use an enclosed container. Enclosed container 28 also preferably conforms to the configuration of power unit 12 as shown in FIGURE 1 in order that it may be clamped on power unit 12 with the most rigidity. Adjacent its upper end container 28 has a small set of clamps 34 which slip easily around shaft 20 when shaft 20 is in position and fit loosely around shaft 20 but provide a diameter smaller than sleeve 36 so as to prevent tooth cleaner member 14 from falling out of its position.

Figure 3:
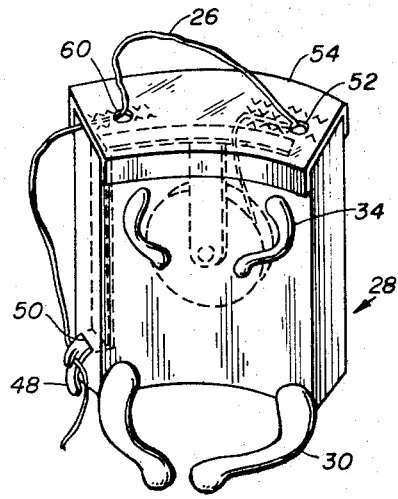
FIGURE 3 is a perspective view of a dental tape supply holding component of the invention showing it removed from its operative position on a power unit component.
Figure 4:
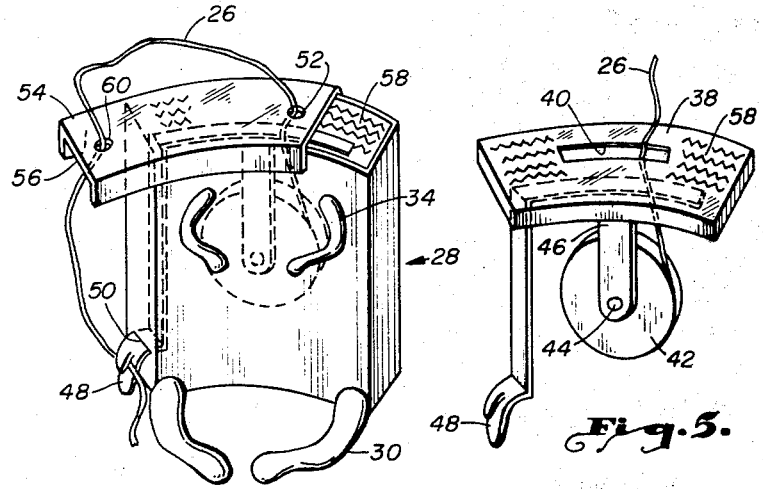
FIGURE 4 is a perspective view of the tape supply holding component of FIGURE 3 with its slide cover partially removed.
Figure 5:
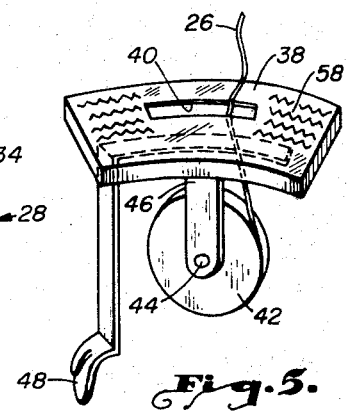
FIGURE 5 is a perspective view of a spool holding component of the invention with a spool of dental tape in place.

FIGURES 3, 4, and 5 show in detail the components of enclosed container 28. In FIGURE 3, enclosed container 28 is shown as it would be in an operative position, with the container tightly closed so that each end of the strand of dental tape is secured. In FIGURE 4, container 28 is shown in an open or adjusting position in which enclosed container 28 is open so that dental tape 26 is no longer tightly secured so that a new clean strand of dental tape may be exposed. FIGURE 5 shows the interior components of enclosed container 28 in detail. A lid 38 fits slidably into the top of container 28 and contains a slotted portion 40 through which dental tape 26 may pass from the interior of container 28. Preferably, a spool of dental tape or floss 42 is positioned on an axle 44 attached to holder 46 which in turn is secured to lid 38. When a spool of dental tape is positioned on shaft 44 and threaded through opening 40 and lid 38 is positioned in container 28, the loading of the container is complete. Lid 38 may contain a tape cutting device 48 which extends through an opening 50 in container 28 when lid 38 is in position. With a spool of dental tape loaded on lid 38 as shown in FIGURE 5, the lid 38 is pressed into position in container 28, and the end of dental tape 26 is threaded through a first opening 52 in a sliding lid 54 which can be slidably positioned on container 28. Sliding lid 54 has a serrated lower surface 56 which conforms to a serrated upper surface 58 of lid 38 when sliding lid 54 is in position on container 28. After the end of dental tape 26 is threaded through first opening 52 of sliding lid 54 it is then threaded through slots 24 in each of prongs 22 then back down to a second opening 60 in sliding lid 54 as shown in FIGURE 4. Then sliding lid 54 is moved to a closed position as in FIGURE 3 and the close fitting serrated surfaces of lid 38 and sliding lid 54 squeeze and hold firmly the strand of dental tape 26, also as shown in FIGURE 3. Then, when power unit 12 is turned on to oscillate tooth cleaner member 14, the movement of prongs 22 will not pull dental tape 26 from its secured position.

Thus, in operation, sliding lid 54 is moved to one side as in FIGURE 4 which releases the tension on dental tape 26 so that the loose end of dental tape 26 may be pulled through opening 60 and, as in FIGURE 1, through openings 24 in prongs 22 and through first opening 52 in sliding lid 54 so that a new unused portion of dental tape is in position between prongs 22. Then, sliding lid 54 is moved back to its closed position so that dental tape 26 is clinched between upper serrated surface 58 of lid 38 and lower serrated surface 56 of sliding lid 54. Then the used end portion of dental tape 26 may be cut off by means of tape cutter 48 extending through the side of container 28. Cutter 48 may be on either the right or left side of container 28.

Figure 6:
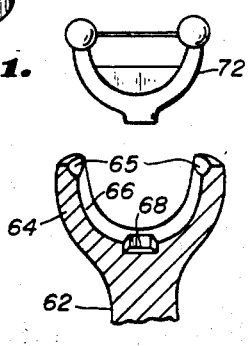
FIGURE 6 is a sectional view of a modified form of tooth cleaning tape component of the invention.
Figure 7:
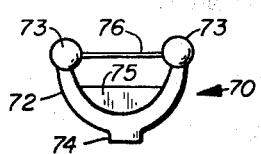
FIGURE 7 is a front elevational view of a removable dental tape insert of the tooth cleaning component shown in FIGURE 6.

FIGURES 6 and 7 describe a modified form of tooth cleaning tape component and a disposable tape insert member. The tooth cleaner member shown in FIGURE 6 includes an elongated shaft 62, similar to shaft 14, which at its lower end 16 includes a slot 18 and sleeve 36 as in the form described in FIGURES 1 and 2 which provide means for holding the tooth cleaner member in place in a power unit. However, instead of the pronged unit 22 at its upper end, elongated member 62 includes a pair of prongs 64, each of which has a socket 65 at the end thereof and a recessed portion 66 on the inner portion, and a slot 68 at the point of juncture of prongs 64. Prongs 64 are thus adapted to receive a disposable type of dental tape insert 70 shown in detail in FIGURE 7. Insert 70 includes a pair of prongs 72, ball-like members 73, a protrusion 74, and a thin membrane 75. Prongs 72 are adapted to fit snugly into recessed portion 66 and protrusion 74 is adapted to fit tightly into slot 68 so that the insert 70 will be held tightly in position in the tooth cleaner member when the unit is in position. Membrane 75 strengthens prongs 72 and provides a means for easily inserting and removing insert 70. Insert 70 also includes a strip of dental tape 76 stretched tautly between prongs 72. The operation of the unit described in FIGURES 6 and 7 is the same as that for the unit shown in FIGURE 1. Thus, the disposable dental tape insert 70 provides a simple, inexpensive, sanitary tooth cleaning device which can be easily manufactured and supplied in small packets.

Since many different embodiments of this invention may be made without departing from the spirit and scope of this disclosure, it is to be understood that the specific embodiments described in detail herein are not to be taken in a limiting sense, since the scope of the invention is best defined by the appended claims.

What is claimed:

1. A power driven dental cleaner comprising:
a power unit and a tooth cleaner member said power unit being adapted to move said cleaner member radially oscillatorily;
said tooth cleaner member including an elongated shaft portion, said shaft portion having a first end thereof received in said power unit and a second end thereof having two prongs therein, each of said prongs having an opening therein receiving therebetween a strand of dental tape;
a dental tape supply holding member positioned on said power unit, said tape supply holding member including a casing holding a spool of dental tape and means on said casing securably holding a strand of dental tape.

2. A power driven dental cleaner as described in claim 1 in which said power unit is electrically driven.

3. A power driven dental cleaner as described in claim 2 in which said prongs are in a plane which lie at an acute angle to the longitudinal axis of said shaft portion.

4. A power driven dental cleaner as described in claim 3 in which said dental tape supply holding member is removably positionable on said power unit.

5. a power driven dental cleaner as described in claim 4 in which said dental tape supply member comprises an enclosed container having a removable lid and said supply member is positionable on said power unit by means of a clamp member, said supply member further including a spool for holding a supply of dental tape.

6. A power driven dental cleaner as described in claim 5 in which said spool is mounted on a spool holding member which further includes a lid portion having an opening for the passage of dental tape therethrough, said lid portion being slidably receivable in an open end of said enclosed container, and said lid portion also having a serrated upper surface, and said enclosed container being enclosed by a slide cover slidably positionable upon said lid portion, said slide cover having a serrated under-surface conformable to said serrated surface of the lid portion, and said slide cover having two openings therein so that a strand of dental tape may pass from said spool through one of said openings to the exterior of said container and may pass through the second of said openings to a position between said serrated surfaces of said lid and slide cover to be held securely between said serrated surfaces when said slide cover is in a closed position.

7. A power driven dental cleaner as described in claim 6 in which said elongated shaft portion includes a ridge member circumferentially around said shaft near said first end to abut a shoulder of said power unit when said shaft is inserted therein, and said enclosed container includes a clasp member adjacent said open end, said clasp member positionable loosely around said shaft near said ridge member to cooperate with said ridge in preventing said shaft member from falling free of said power unit.

8. A power driven dental cleaner comprising:
a power unit and a tooth cleaner member said power unit being adapted to move said cleaner member radially oscillatorily;

said tooth cleaner member including an elongated shaft portion, said shaft portion having a first end thereof received in said power unit and a second end thereof removably receiving at an angle to the longitudinal axis of said shaft member a disposable dental tape insert; and said dental tape insert member comprising a base portion having two prongs extending therefrom and a strand of dental tape extending tautly between said prongs.

9. A power driven dental cleaner as described in claim 8 in which said power unit is electrically driven.

10. A power driven dental cleaner comprising:
a power unit and a tooth cleaner member said power unit being adapted to move said cleaner member radially oscillatorily;

said tooth cleaner member including an elongated shaft portion, said shaft portion having a first end thereof received in said power unit and a second end thereof having two prongs therein, each of said prongs having an opening therein receiving therebetween a strand of dental tape.

References Cited

UNITED STATES PATENTS

| | | | |
|---|---|---|---|
| 867,264 | 10/1907 | Evans | 132—92 |
| 3,378,017 | 4/1968 | Stiles | 132—92 |

LOUIS G. MANCENE, *Primary Examiner.*

J. W. MITCHELL, *Assistant Examiner.*